United States Patent [19]
Gharadjedaghi

[11] 4,281,903
[45] Aug. 4, 1981

[54] ELECTRO-OPTIC PASSIVE DISPLAY CELL
[75] Inventor: Fereydoun Gharadjedaghi, Neuchatel, Switzerland
[73] Assignee: Ebauches S.A., Neuchatel, Switzerland
[21] Appl. No.: 8,239
[22] Filed: Feb. 1, 1979
[30] Foreign Application Priority Data
Feb. 6, 1978 [CH] Switzerland .................. 1272/78
[51] Int. Cl.³ ............................................. G02F 1/137
[52] U.S. Cl. ................................. 350/349; 350/350 R; 252/299.1; 252/299.68
[58] Field of Search ..................... 350/344, 350 R; 252/299
[56] References Cited
U.S. PATENT DOCUMENTS
4,143,947  3/1979  Aftergut et al. ............. 350/350 R X FOREIGN PATENT DOCUMENTS
2658568  7/1977  Fed. Rep. of Germany.

Primary Examiner—Edward S. Bauer
Attorney, Agent, or Firm—Silverman, Cass & Singer, Ltd.

[57] ABSTRACT

An electro-optic passive display device comprising a pair of plates having, as an active component between the plates, a mixture comprising a nematic liquid crystal possessing negative dielectric anisotropy, dichroic molecules and a chiralic compound capable of providing a helical structure to the active component, the chiralic compound concentration being selected to produce a pitch of the helix between 0.9d and 3d, "d" being the distance between plates, critical to ensure the formation of a helical structure only under the effect of an electric field and to provide a high contrast display.

6 Claims, 2 Drawing Figures

ELECTRO-OPTIC PASSIVE DISPLAY CELL

BACKGROUND OF THE INVENTION

The present invention relates to an electro-optic passive display cell comprising an active component imprisoned between two plates separated from each other by a frame to which the said plates are assembled tightly, the inner faces of the said plates carrying control electrodes and being covered with a coating of a material aligning the molecules of the active component.

Such cells are known per se. A solution for obtaining their active constituent consists in mixing dichroic molecules with a nematic liquid crystal having a positive dielectric anisotropy. These cells are easy to be realized and do not necessarily require polarizers, as it is generally the case for these display cells having a nematic helical liquid crystal. Unfortunately, these dichroic molecule containing cells effect a colorless display (in the activated zones) on a background the color of which is the complement of the color corresponding to the wave length or lengths absorbed by the dichroic molecules.

For removing this drawback, it has been suggested to use nematic liquid crystals having a negative dielectric anisotropy, the molecules of which are oriented homeotropically, perpendicularly to the plates, in the absence of an electric field. When an electric field is applied to the plates, the molecules become oriented in a direction parallel thereto. These type of cells need high electric fields since presently there do not exist nematic liquid crystals having a negative dielectric anisotropy the coefficient $|\Delta\epsilon|$ of which is higher than 7, while, for the liquid crystals having a positive dielectric anisotropy, $\Delta\epsilon$ can reach a typical value of 25. Moreover, one observer that without the presence of a polarizer, the contrast is generally insufficient.

It is known, especially as shown in the German Patent Application (DOS) No. 26 58 568, to use as an active component a mixture of a nematic liquid crystal having a negative dielectric anisotropy, dichroic molecules and a chiralic compound owing to which the mixture assumes a helical structure when an electric field is applied thereto. Such a cell effects the display as dark areas on a clear background. For the double purpose of increasing the commutation speed of the cell and of improving its contrast, the concentration of the chiralic compound is chosen in such a way that the pitch of the helix has a value of 0.7 to 10 times the value of the thickness of the cell.

Applicant has discovered that a cell as described in said German Patent Application (DOS) No. 26 58 568 fails to have satisfactory contrast for all range of concentrations indicated. The invention seeks to provide a display cell of this general type having improved performance and contrast characteristics.

SUMMARY OF THE INVENTION

The display cell according to the invention, comprises, as its active components, a mixture a nematic liquid crystal having a negative dielectric anisotropy, dichroic molecules and a chiralic compound where the concentration of chiralic compound is selected so that the pitch P of the helix is not substantially smaller than the distance d between the two plates of the cell. If this condition is fulfilled, one prevents the mixture from taking spontaneously, that is in the absence of an electric field, a helical structure. The absence of a spontaneous homeotropic structure prevents the correct operation of the cell, even if the pitch P is only slightly smaller than the distance d as it is the case, especially, in the known cell hereabove disclosed when the pitch is 0.7d or 0.8d. For the sake of precision, the smallest limit for the pitch of the helix is 0.9d.

Preferably, the amount of the chiralic compound is also adjusted in such a way that the pitch of the helix is substantially equal to or slightly higher or greater than the distance d.

Typically, it is particularly advantageous that the value of the pitch does not go beyond 3d.

When this second condition is fulfilled, the application of an electric field causes the mixture to pass from a homeotropic structure to a helical structure having, due to the fact that its pitch is as small as allowed, optimal qualities of light absorption. Hence, the display has an excellent contrast in contrast with a cell having a helical structure with large pitch, as it is the case for the hereabove disclosed known cell in the range:

$$3d < P < 10d$$

As a matter of fact, where the pitch is so high as to be within the range $3d < P < 10d$, the axis of absorption of the molecules is relatively little modified with respect to the case of a homeotropic structure, so that the contrast is insufficient to enable good reading of the cell.

Accordingly, the display cell according to the invention is characterized by a concentration of the chiralic compound selected within a range so that its active component is caused to assume a helical structure only under the effect of an electric field and that the pitch of the helix is then as small as possible.

Other characteristics of the present invention will appear from the following specification which relates to the annexed drawings and describes, by way of explicative but not limitative example, an embodiment of such a cell.

DESCRIPTION OF A PREFERRED EMBODIMENT

Figure 1:
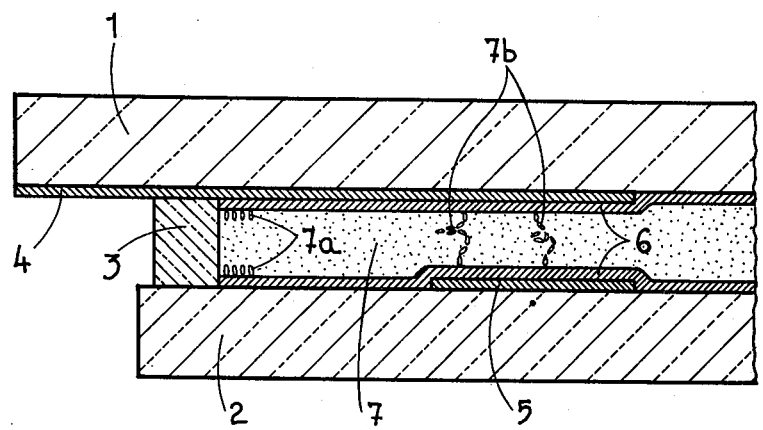
FIG. 1 is a diagrammatic sectional view of a part of an electro-optic passive display cell.

The electro-optic passive display cell represented comprises a front plate 1, made of glass, separated from a ceramic or glass rear plate 2 by a frame 3, the assembly between these three elements being tight. The facing surfaces of these two plates 1 and 2 carry control electrodes 4 and 5, respectively, and are each coated with an homeotropic alignment coating or layer 6 comprising magnesium fluoride ($MgF_2$) or a quasi-monomolecular coating of lecithin. It is recalled that a coating or aligning film is able to orient the molecules of a liquid crystal when the latter is placed on the said coating. Such a coating can be realized either while applying the alignment material before filling the cell, or by mixing with the active component, a voltage-active agent adsorbed on the plates, which thus ensures the alignment of the molecules of the active component.

Inside the frame 3, an active component 7 is imprisoned between the two plates 1 and 2. This active component comprises a mixture of a nematic liquid crystal having a negative dielectric anisotropy, dichroic molecules and a chiralic compound capable of providing a helical structure to the active component. The concentration of the chiralic compound is such that the pitch of the helix is not substantially smaller than the distance between the two plates, so as to guarantee formation of a homeotropic structure when no electric field is applied to the cell. Preferably, this concentration is selected such that the pitch P is substantially equal to or slightly higher or greater than d. For the sake of precision, the pitch P is such that:

$$0.9d \leq P < 3d$$

It will be recalled here that the concentration in weight c of the chiralic compound is related to the pitch P of the helix by the expression $1/P = k \cdot c$, where k is a constant characterizing the chiralic compound.

This narrow range defines the optimal conditions of operation of the cell, for which the pitch of the helix has the smallest possible value; compatible with the presence of a helical structure only under the effect of the electric field. The pitch of the helix being very small, the absorption of the light is very high, and hence the contrast is excellent.

One can use, for the realization of the active component 7, a mixture comprising 1.75% by weight of cholesteryl oleyl carbonate (COC) as a chiralic compound, 1% by weight of dichroic molecules, for instance the dichroic molecules D3 of the firm BDH (Great Britain), the rest, that is to say 97.25% by weight, being nematic liquid crystal, in this example, the liquid crystal MBBA (methoy-benzyliden-butyl-aniline). The constant k for the chiralic compound COC being 0.055, the pitch of the helix obtained under the effect of a field is $10.4\mu$. Such a mixture is used in a cell the two plates of which are at a distance from each other of $8.6\mu$. For a cell the plates of which are at a distance of $15\mu$, the amount of compound COC will be advantageously 1.15%, which corresponds to a pitch of $15.75\mu$. Thus, for these two examples, the pitch of the helix is respectively equal to 1.2d and 1.05d.

A cell constructed in the manner last described can operate with a control voltage of 3 Veff. A cell operating with the same nematic liquid crystal having a negative dielectric anisotropy (MBBA), associated with dichroic molecules, but without a chiralic compound, the control voltage must be of the order of 6 $V_{eff}$.

The operation of the cell disclosed and represented is the following:

In the absence of an electric field, the homeotropic aligning coating 6 has the effect of aligning the molecules perpendicularly to the plates of the cell, as indicated at 7a in FIG. 1. The dichroic molecules which are integrated in this homeotropic structure have their axis of light absorption perpendicular to the plates. Hence, the zones of the cell which are not subjected to the electric field are transparent.

Figure 2:
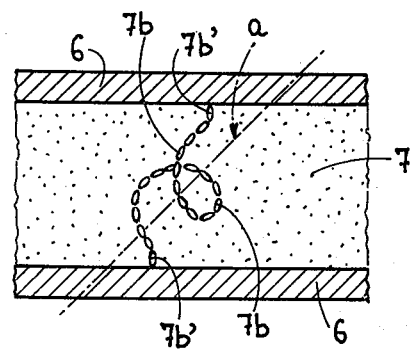
FIG. 2 is a perspective view of a detail thereof at a larger scale.

When an alternating electric field having a frequency between 50 and 1000 Hz is established between the electrodes 4 and 5, molecules 7b' *l which are in the vicinity of the plates 1 and 2 remain aligned oriented perpendicular to said plates while the other molecules 7b* take a helical structure the axis a of which tends to align itself oriented perpendicular to the plates (FIG. 2). The pitch of the helix is, as indicated previously, substantially equal or slightly greater than the distance between the plates. The dichroic molecules which are integrated in the helical structure, then no longer have their axis of light absorption perpendicular to the plates. Thus, the zones subjected to the field appear with a color which is complementary to the wave length or lengths absorbed by when the dichroic molecules. The pitch of the helix has the smallest possible value, the light absorption is very high and, consequently, the contrast (dark on a clear background) is excellent. This contrast is further improved by the fact that a helical structure reduces the two components of the electromagnetic wave of the non-polarized light, the dichroic molecules being aligned in the helical structure.

It is known that some liquid nematic crystals, such as ZLI 518 of the firm MERCK (Germany), show a positive dielectric anisotropy for low frequencies (in this case lower than 10 kHz at the room temperature) while for a higher frequency, they show a negative dielectric anisotropy. It is obvious that such compounds can also be used in the cell according to the invention, the control of the passage from the homeotropic state to the helical state being produced by a high frequency field while the effacement can be favored by the application of a low frequency field.

What I claim is:

1. An electro-optic passive display cell comprising: two substantially parallel spaced plates; a frame sealed between said plates and defining a tight chamber therebetween; control electrodes arranged on the inner facing surfaces of said plates for providing an electric field therebetween; a coating of homeotropic alignment material covering said inner surfaces and said electrodes, an active component disposed in said chamber, said active component comprising a mixture of a nematic liquid crystal having a negative dielectric anisotropy, dichroic molecules and a chiralic compound capable of providing a helical structure to the said active component when an electric field is applied and a homeotropic structure in the absence of an applied electric field, the concentration of the said chiralic compound being selected to provide a pitch of the helical structure having a value substantially comprised between 0.9 and 3 times the distance between plates whereby satisfactory readable contrast is provided between areas under effect of an electric field and areas where such electric field effect is absent.

2. The display cell as claimed in claim 1, in which the nematic liquid crystal is methoxy-benzyliden-butyl-aniline.

3. The display cell as claimed in claim 1, in which said chiralic compound is cholesteryl oleyl carbonate.

4. An electro-optic passive display cell comprising:
two substantially parallel spaced plates;
a frame sealed between said plates and defining a tight chamber therebetween,
control electrodes arranged on the inner facing surfaces of said plates for providing an electric field therebetween; and
a coating of homeotropic alignment material covering said inner surfaces and the said electrodes,
an active component disposed in said chamber, said component comprising a mixture of a nematic liquid crystal having a negative dielectric anisotropy, dichroic molecules and a chiralic compound capable of providing a helical structure to the said active component when an electric field is applied, the concentration of said chiralic compound selected to provide a pitch of the said helical structure having a value substantially comprised between 0.9 and 3 times the distance between plates whereby to be compatible with the spontaneous formation of a homeotropic structure in the absence of an electric field.

5. The display cell as claimed in claim 4, in which the nematic liquid crystal is methoxy-benzyliden-butyl-aniline.

6. The display cell as claimed in claim 4, in which said chiralic compound is cholesteryl oleyl carbonate.

* * * * *